United States Patent [19]

Imazaike

[11] 4,437,356

[45] Mar. 20, 1984

[54] GEAR

[76] Inventor: Mikiharu Imazaike, 26-1 Nishi, 2-chome, Tezukayama, Sumioshi-ku, Osaka, Japan

[21] Appl. No.: 240,358

[22] Filed: Mar. 4, 1981

[30] Foreign Application Priority Data

Mar. 22, 1980 [JP] Japan .................................. 55-37585
Mar. 22, 1980 [JP] Japan .................................. 55-37586

[51] Int. Cl.³ ........................ F16H 57/00; F16H 55/14
[52] U.S. Cl. ...................................... 74/411; 74/461; 74/443
[58] Field of Search ................. 74/460, 461, 411, 449, 74/445, 440, 439, 443, 441

[56] References Cited

U.S. PATENT DOCUMENTS

| 738,012 | 9/1903 | Dodge | 74/460 |
|---|---|---|---|
| 1,081,996 | 12/1913 | Weist | 74/460 |
| 1,128,789 | 2/1915 | Juengst | 74/460 |
| 1,141,098 | 6/1915 | Alquist | 74/461 |
| 2,845,809 | 2/1955 | Hetzel | 74/440 |
| 2,862,400 | 3/1957 | D'Angelo | 74/460 |
| 2,955,481 | 3/1958 | Jackel | 74/443 |
| 3,013,440 | 12/1959 | White | 74/443 |
| 3,081,648 | 3/1963 | Duer | 74/460 |
| 3,199,364 | 8/1965 | Dew | 74/460 |
| 3,213,704 | 10/1965 | McDougal | 74/440 |
| 3,385,126 | 4/1966 | Finch | 74/440 |
| 3,496,802 | 2/1970 | Cork et al. | 74/461 |
| 3,916,716 | 11/1975 | Rix et al. | 74/461 |
| 4,106,360 | 8/1978 | Manna | 74/440 |
| 4,127,041 | 11/1978 | Imazaike | 74/461 |

FOREIGN PATENT DOCUMENTS

| 523317 | 10/1953 | Belgium | 74/445 |
|---|---|---|---|
| 5723151 | 7/1979 | Japan . | |
| 7708864 | 8/1977 | Netherlands | 74/DIG. 10 |
| 700873 | 12/1953 | United Kingdom | 74/445 |

OTHER PUBLICATIONS

Article on p. 88 of *Motor* Magazine, dated May 1940, "Aluminum Camshaft Gear".

*Primary Examiner*—L. Staab
*Assistant Examiner*—M. Bednarek
*Attorney, Agent, or Firm*—Jordan and Hamburg

[57] ABSTRACT

A gear, chiefly for use in timepieces, acoustic devices and like precision apparatus, is made of an elastic material and comprises teeth alternately arranged in two rows, that is, a front and rear row and axially positioned away from one another. Each of the teeth has a leg extending from the main body of the gear and a meshing portion integral with the outer end of the leg and engageable with another gear with which it is adapted to mesh. The legs of each two adjacent teeth in each of the front and rear rows are spaced apart from each other circumferentially of the gear by a specified distance to render the teeth elastically deformable for cushioning and thereby eliminate noise when the gear meshes with another gear. Even when the gear has a small module, the legs of the teeth in each of the front and rear rows can be spaced apart by a large distance, so that the gear can be formed easily, for example, by injection molding.

12 Claims, 17 Drawing Figures

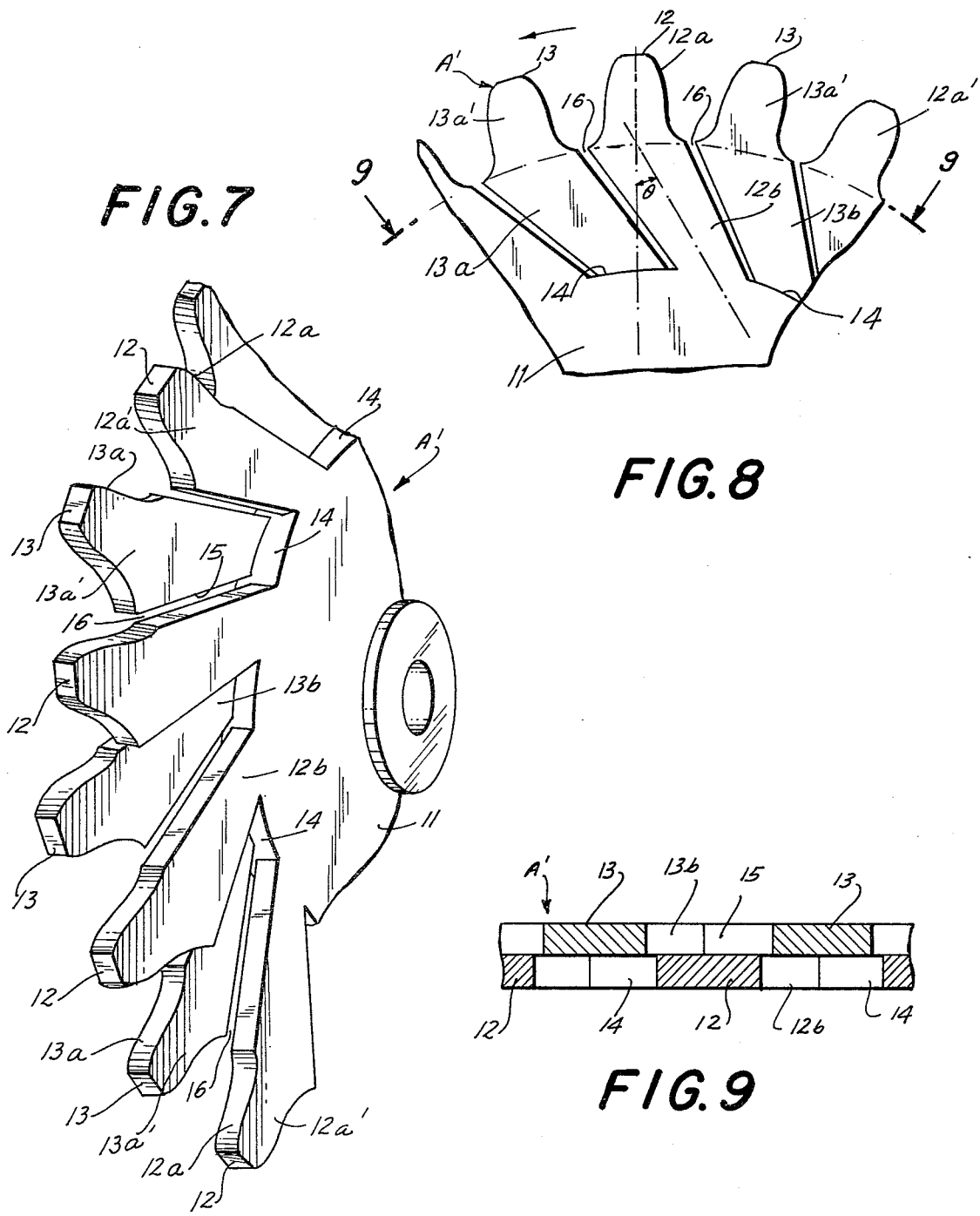

GEAR

BACKGROUND OF THE INVENTION

The present invention relates to gears chiefly for use in precision apparatus, such as timepieces and acoustic devices, and more particularly to gears which are operable with reduced meshing noises.

In recent years, gears of plastics have been widely used for timepieces, acoustic devices and like precision apparatus. When meshing, gears usually make noise (impactive noise) due to striking contact between the teeth. Gears in timepieces or the like which rotate intermittently and repeatedly specially produce impact noise every time the gears rotate. Gears of plastics, which are made by injection molding, involve eccentricity or some other strain, for example, due to shrinkage during molding and therefore make noise when meshing. Thus when gears involve eccentricity or errors in the pitch of the teeth, they fail to come into contact with each other at the specified portions of the opposing teeth, allowing for either interference of teeth or teeth meshing with each other with improper timing. Consequently, the meshing portions are subjected to marked variations of the load which give rise to vibration or noises. Such impact noises and noises due to strain or deformation are very disagreeable in the case of timepieces or acoustic devices.

To eliminate meshing noises by causing the gear to absorb impact and strain, it is already known to form in each tooth a cut groove which extends from the mid-portion of its ridge toward the axis to a given depth, or to form a cut groove in each furrow portion between the teeth so as to render the teeth elastically deformable by such grooves. However, in providing a gear of relatively small diameter, especially of a small module, with such a conventional structure in which the pitch of the teeth is small and therefore the cut grooves must have a very small width, extreme difficulties are encountered in making the gear when injection molding is used, because it is extremely difficult to make a mold which is shaped to form the grooves.

Further, since meshing noises are attributable to the torque acting on the teeth, it might appear useful to reduce the torque by increasing the diameter of the gear or the number of the teeth, but this is not feasible with timepieces and like precision devices in which it is necessary to use gears of small diameters.

SUMMARY OF THE INVENTION

An object of the present invention which is intended to overcome the drawbacks of conventional gears is to provide a gear in which the teeth are fully deformable when meshing to prevent noises, even if the gear has a small module.

Another object of the invention is to provide a gear which is easy to manufacture while being operable with reduced noise.

Another object of the invention is to provide a gear in which the teeth are elastically deformable when meshing and thereafter restorable to original shape with greatly reduced elastic vibration to thereby prevent variations in the pitch due to vibration, the gear thus being made usable with improved precision and with greatly reduced noise in timepieces and like devices.

Another object of the invention is to provide a gear in which the elastic deformation portions of the teeth for meshing are so shaped that the divided mold members can be fitted together with ease, especially when the gear is made by injection molding with a pair of divided mold members. Thus the gear is very easy to manufacture.

Still another object of the invention is to provide a gear in which a tooth, when greatly elastically deformed upon meshing with another gear, is still out of contact with the next tooth and which is therefore advantageous when the teeth are made greatly elastically deformable.

Other objects and advantages of the invention will become apparent from the following description of embodiments with reference to the accompanying drawings.

BRIEF DESCRIPTION OF THE DRAWINGS

FIG. 7 is a fragmentary perspective view showing another embodiment of a gear according to the invention and different from the embodiment of FIGS. 1 to 4 in the direction in which the leg of each tooth extends from the main body of the gear;

FIG. 8 is a fragmentary front view showing the gear of FIG. 7;

FIG. 9 is a view in section taken along the line IX—IX in FIG. 8;

DESCRIPTION OF THE PREFERRED EMBODIMENTS

Figure 1:
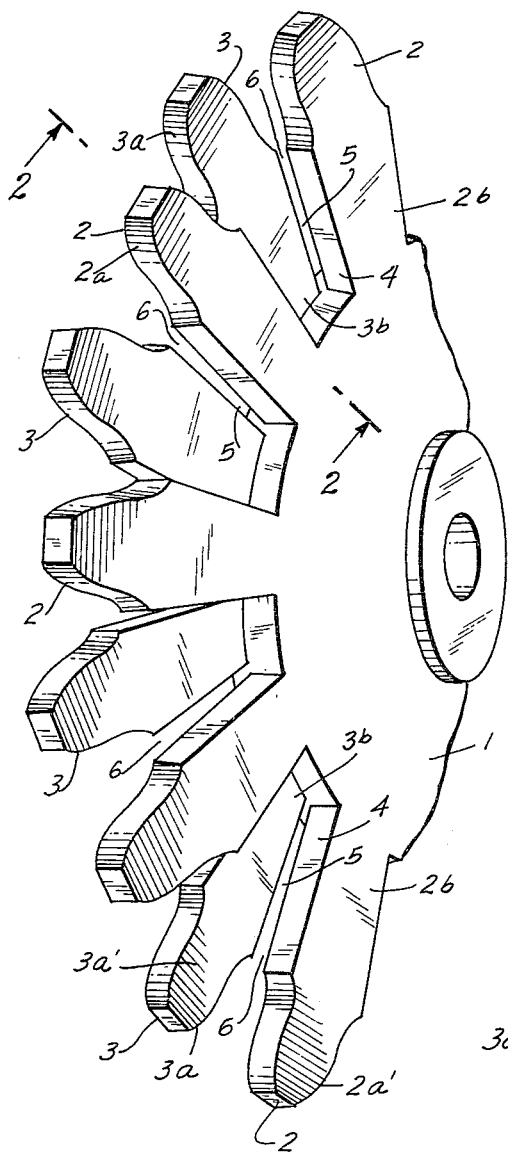
FIG. 1 is a perspective view partly broken away, of a gear according to one embodiment of this invention.
Figure 2:
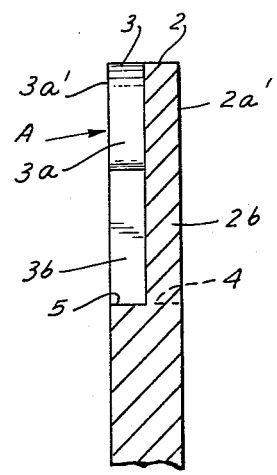
FIG. 2 is a fragmentary view in section taken along the line II—II in FIG. 1.
Figure 3:
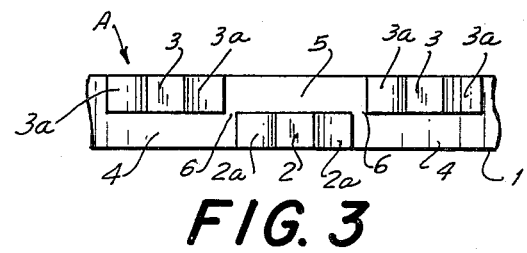
FIG. 3 is a development of part of the gear as seen from outside of its outer periphery to illustrate the arrangement of teeth.

With reference to FIGS. 1 to 4, a gear A has a main body 1 and a multiplicity of teeth 2 and 3 extending from the outer periphery of the main body 1 and integral therewith. The teeth 2 and 3 are alternately arranged in two rows, that is, a front and rear row circumferentially of the gear A and alternately positioned away from one another axially of the gear A. When the gear A is viewed in an axial direction from the front rear, the teeth 2 and 3 are arranged with a constant circumferential pitch as is the case with conventional gears. However, when the gear A is viewed three-dimensionally, the teeth 2 and 3 are alternately arranged circumferentially in respective axially separated front and rear rows, with the teeth in each row being arranged in the same plane perpendicular to the axis of the gear. Each of the teeth 2 (or 3) has a leg 2b (or 3b) extending from the gear main body 1, and a meshing portion 2a' (or 3a') integral with the outer end of the leg 2b (or 3b) and engageable with another gear. The teeth 2 and 3, including the meshing portions 2a' and 3a' and legs 2b and 3b, are arranged in two separate rows as mentioned above, in staggered arrangement to thereby space the legs 2b (3b) in each of the front and rear rows at a given distance. Thus spaces 4 and 5 are formed between the legs 2b and 3b to render the teeth 2 and 3 elastically deformable. The spaces 4 between the legs 2b of the teeth 2 and the spaces 5 between the legs 3b of the teeth 3 extend radially from the gear.

The meshing portions 2a' and 3a' correspond to the teeth of a conventional gear and have contact faces 2a and 3a, respectively, on the circumferentially opposite sides thereof. In the present embodiment, the teeth 2, 3 including the meshing portions 2a', 3a' and the legs 2b, 3b respectively, have one half the thickness of the main body 1. The teeth 2, 3 extend from the front half and rear half respectively, of the outer periphery of the main body in the aforementioned arrangement. The spaces 4, 5 have a larger width than the legs 2b, 3b, so that the leg 2b of each tooth in the front row is circumferentially spaced apart by a clearance 6 from the leg 3b of the tooth 3 in the rear row immediately adjacent to the front row tooth leg 2b, chiefly to render the gear easy to mold.

In view of elasticity and other properties, it is advantageous to construct the gear A from urethane resin, but the gear may also be made from other resins having high abrasion resistance and mechanical strength. Relatively soft metals, such as aluminum and copper, are also feasible. The gear is made in the form of an integral single piece, for example, by injection molding.

With the construction of this invention, gears can be easily produced even if they are small in module. When cut grooves are to be formed between the teeth of a spur gear of conventional construction having a small module to render the teeth elastically deformable, the grooves must be formed with a very small width, consequently presenting difficulties in making the mold for the gear. According to the invention, however, the legs 2b (3b) of the teeth 2 (3) in each of the front and rear rows are separated by the space 4 (5) having a large width. Accordingly, it is easy to make a pair of divided mold members corresponding to the front half and rear half of the gear A and to integrally mold the gear A by using the mold members.

Figure 4:
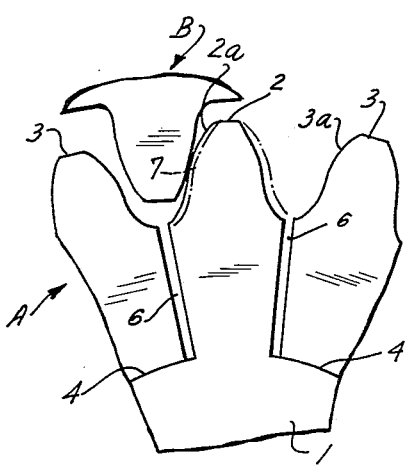
FIG. 4 is a fragmentary view of the gear in mesh with another gear.

FIG. 4 shows the gear A meshing with another gear B during use. When a conventional spur gear is used as the gear B, the two gears are in mesh with each other in such a manner that the tooth of the gear B is positioned intermediately of the front and rear teeth 2, 3 of the gear A, or the tooth of the gear B has such a thickness as to contact both the teeth 2, 3. When desired, a gear of this invention may also be used as the gear B, with the teeth of one gear engaging with the corresponding teeth of the other gear in the front rows and rear rows respectively. In this case, the two meshing gears both serve to reduce the involved noise.

During use, the spaces 4, 5 give elasticity to the teeth 2 and 3 by permitting them to deform elastically when the gear A meshes with the gear B. This cushions the contact faces 2a, 3a for meshing to prevent occurrence of impact noise. Further, when the force acting on the point of contact 7 varies owing to an error in the pitch of the teeth or the like, the tooth acted on deforms as indicated in the broken line in FIG. 4, whereby the variation of the force is offset to eliminate an abrupt variation in the load on the tooth. In this way, the meshing noise resulting, for example, from an error in the pitch of the teeth is avoidable.

In the present embodiment, the spaces 4, 5 have a larger width than the legs 2b, 3b of the teeth 2, 3 to form a clearance 6 between the leg 2b of each tooth 2 in the front row and the leg 3b of the tooth 3 in the rear row immediately adjacent to the front row tooth leg 2b to space these legs apart circumferentially of the gear. Within the range of these clearances 6, the teeth 2, 3 are elastically deformable without coming into contact with one another. Further, even if the teeth 2, 3 elastically deform exceeding this range, the teeth merely come into sliding contact with each other face-to-face but will not strike each other circumferentially of the gear, so that the teeth are elastically deformable within the range of the spaces 4, 5 although involving some frictional resistance.

Figure 5:
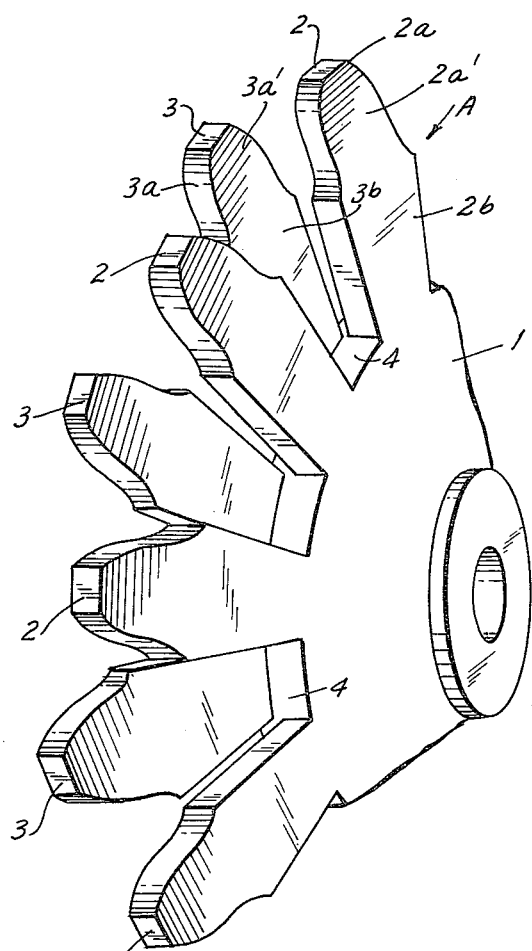
FIG. 5 is a fragmentary perspective view showing another embodiment of a gear according to the invention and different from the embodiment of FIGS. 1 to 4 in the arrangement of teeth.
Figure 6:
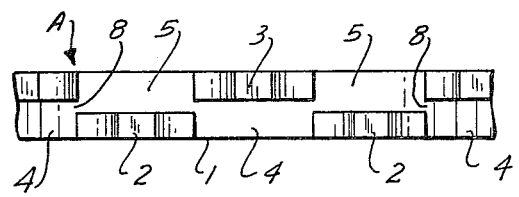
FIG. 6 is a development of part of the gear shown in FIG. 5 as it is seen from outside of its outer periphery to illustrate the arrangement of the teeth.

FIGS. 5 and 6 show another embodiment, in which the front row teeth 2 are axially spaced from the rear row teeth 3 by a clearance 8. In this case, the above-mentioned clearances 6 need not always be provided between the legs 2b of the front row teeth 2 and the legs 3b of the rear row teeth 3, but the spaces 4, 5 in the front and rear rows may have the same width as the legs 2b, 3b of the teeth 2, 3. This arrangement renders the teeth 2, 3 circumferentially elastically deformable at all times without coming into contact with one another. In fact, the teeth 2, 3 are greatly deformable within the range of the spaces 4, 5 while being held out of contact with one another. According to the first embodiment, however, the teeth 2, 3 are elastically deformable, basically within the range of the spaces 4, 5, and even within the range in which the teeth 2, 3 are held out of contact with each other. The elastic deformation of the teeth permitted is generally sufficient for the prevention of noises. It is more advantageous to make the first embodiment in that it is easier to fit the divided mold members together at the front and rear row space forming portions.

FIGS. 7 to 10 show another embodiment of the invention. With reference to these drawings, a gear A' is similar to the first embodiment in that it has a main body 11 and a multiplicity of teeth 12 and 13 extending from the outer periphery of the main body 11 and integral therewith. The teeth 2, 3 are alternately arranged in two rows, that is, a front and rear row disposed circumferentially of the gear, namely in a staggered fashion as a whole, by being positioned away from one another axially forwardly and rearwardly of the gear. The second embodiment is further similar to the first embodiment in that each of the teeth 12 (or 13) has a leg 12b (or 13b) extending from the gear main body 11, and a meshing portion 12a' (or 13a') integral with the outer end of the leg 12b (or 13b) and engageable with another gear, and also in that spaces 14, 15 are formed between the legs 12b and between the legs 13b respectively, rather than between the meshing portions 12a', 13a' which correspond to conventional teeth. With the second embodiment, however, the legs 12b, 13b, as well as the spaces 14, 15 therebetween, are inclined at a specified angle $\theta$ with respect to the radial direction. Stated more specifically, the legs 12b, 13b extend from the front half and rear half respectively, of the outer periphery of the main body 11 as inclined toward a circumferential direction at the angle $\theta$ with respect to the radial direction to provide the meshing portions 12a', 13a' integral with the legs, whereby the inclined spaces 14, 15 are formed between the corresponding legs in the front and rear rows.

The direction of inclination of the legs 12b, 13b, as well as the spaces 14, 15, is such that when the contact faces 12a, 13a of the meshing portions 12a', 13a', each on one side thereof, are subjected to the load or torque imparted by another gear meshing with the gear A', the angle of inclination $\theta$ increases due to the resulting elastic deformation. For example, when the gear A' is used as a driven gear and is subjected to the torque indicated by the arrow in FIG. 8, the direction in which the legs 12b, 13b extend from the main body 11 is inclined toward the direction of rotation, whereas the legs are reversely directed when the gear is used as a drive gear. However, the requirement relating to the relationship between the direction of inclination and the direction of rotation of the gear can be fulfilled by suitably mounting the gear in place. The angle of inclination $\theta$, which is preferably about 30 degrees with respect to the radial direction, is not always limitative but is suitably variable in accordance with the material, function, etc. of the gear to serve the contemplated purpose.

The inclined legs 12b, 13b and spaces 14, 15 may be so formed that the leg 12b of each tooth 12 in the front row is circumferentially spaced apart from the leg 13 of the rear row tooth 13 immediately adjacent thereto by a specified clearance 16, or the front row teeth may be axially spaced apart from the rear row teeth by a small distance.

The gear A' of this embodiment is constructed from the same material by the same means as the gear A of the first embodiment.

Figure 10:
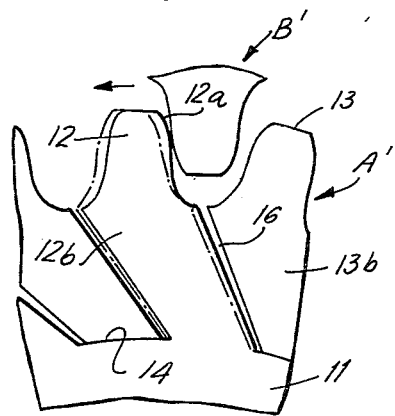
FIG. 10 is a fragmentary view of the gear shown in FIG. 7 meshing with another gear.

FIG. 10 shows the gear A' meshing with another gear B' during use. As is the case with the first embodiment, the gear B' may be a conventional spur gear or a gear of the same type as the gear A'.

When the gear A' meshing with the gear B' is used, for example, as a driven gear and is intermittently rotated by being given torque by the gear B' at a short time interval as indicated by the arrow in FIG. 10 as is the case with a timepiece gear, the gear A' operates in the following manner.

During rotation, the tooth 12 or 13 is elastically deformed as indicated by the broken line in FIG. 10 by the load acting on the contact face 12a or 13a. Since the tooth deforms at this time in such a direction that the angle of inclination of the leg 12b or 13b increases, sufficient elasticity is available. Like the gear A of the first embodiment, therefore, the cushioning action prevents the occurrence of impact noise and also eliminates the meshing noise that would result from an error or strain involved in the gear. When the gear A' comes to a halt, the tooth 12 or 13 will vibrate due to the elasticity, but since a force against the rotation of the gear A' acts on the inclined leg 12b or 13b in the direction of extension of the tooth at this time, this force rapidly attenuates the vibration.

Figure 11:
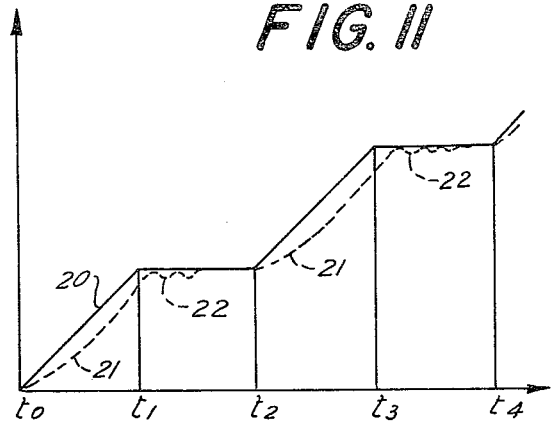
FIG. 11 is a graph showing the movement of a tooth of the gear of FIG. 7 in relation to the angle of rotation and time when the gear is rotated intermittently.
Figure 13:
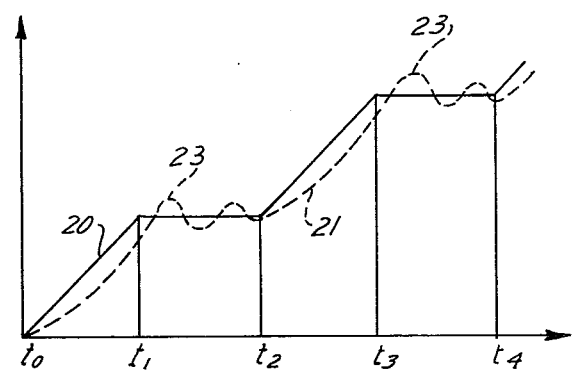
FIG. 13 is a graph showing the movement of a tooth of an elastically deformable conventional gear in relation to the angle of rotation and time when the gear is rotated intermittently.

To illustrate this attenuating effect more specifically, FIGS. 11 and 13 show the relationship between the angle of rotation and time observed in the case of the gear A' and a gear, used for comparison, which is formed with radial cut grooves between its teeth. In each of these graphs, a solid line 20 represents the primary motion of the gear which intermittently rotates during the periods of $t_0$ to $t_1$ and $t_2$ to $t_3$, and stops during the periods of $t_1$ to $t_2$ and $t_3$ to $t_4$. Due to the elastic deformation of the teeth permitted by the spaces or cut grooves, the gear rotates during the periods of $t_0$ to $t_1$ and $t_2$ to $t_3$ with a delay relative to the primary motion (curve 21). At the stopping points $t_1$ and $t_3$, vibration of the tooth follows due to inertia and elasticity.

Figures 14A, 14B, 14C:
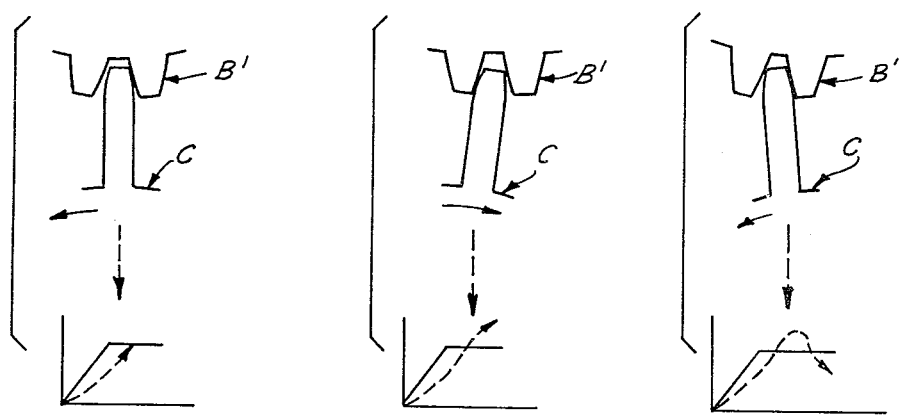
FIGS. 14A–14C show the movement of the tooth of a conventional gear in diagrams and corresponding graphs.

On coming to a halt, the gear having the radial grooves vibrates at the normally halted position, moving to and fro elastically to the same extent as indicated in the wavy broken line 23 in FIG. 13. FIG. 14 shows schematically this motion of the gear in corresponding relation to the graph. It is seen that after the driven gear C meshing with the drive gear B' has reached the normally halted position (FIG. 14 (a)) upon stopping of the drive gear B', the gear C further advances in the direction of rotation with the elastic deformation of the tooth (FIG. 14 (b)), thereby producing a great restoring force. Subsequently, this restoring force reversely rotates the driven gear, greatly retracting the gear beyond the normally halted position (FIG. 14 (c)) to thereby give rise to a positive restoring force. This motion takes place repeatedly hence causing sustained vibration, which is likely to alter the pitch of the teeth, impairing the precision, for example, of a timepiece or making meshing noises.

Figure 12A:
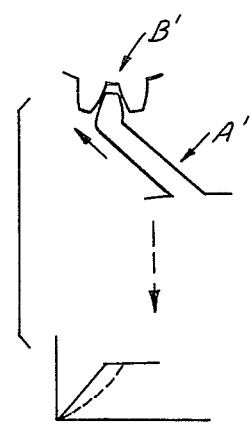
FIGS. 12A and 12B show the movement of the tooth in corresponding diagrams and graphs.
Figure 12B:
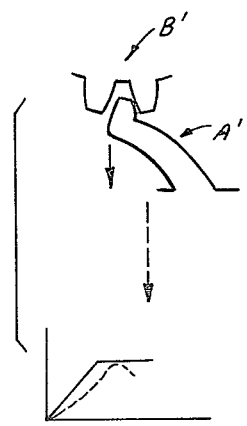

FIG. 12 shows the motion of the gear A' illustrated in FIGS. 7 to 10. It is seen that although the gear has sufficient elasticity in one direction to afford a cushioning effect, a force acts on the leg 12b or 13b against the inertial rotation of the gear A' on the drive gear B' coming to a halt (FIG. 12 (a)) to restrain the advance of the gear A' and elastic deformation of the tooth. The rotational displacement due to the resulting reaction is small (FIG. 12 (b)). During the stopping periods $t_1$ to $t_2$ and $t_3$ to $t_4$ shown in FIG. 11, the vibration of the gear A' is small as indicated in broken lines 22 and is attenuated rapidly.

As described above, the gear of this invention has spaces between the legs of its teeth for permitting elastic deformation of the teeth when the gear meshes with another gear, thereby preventing impact noise produced upon meshing of opposing teeth and also precluding meshing noise due to an error in the pitch of the teeth or the like. Furthermore, the teeth including the meshing portions and legs are arranged in axially separated front and rear rows in a staggered arrangement, with the teeth in each of the rows separated by such spaces, so that the width of the spaces permitting the elastic deformation of the teeth can be increased. The gear is therefore easy to manufacture, for example, by injection molding even if the gear has a small module. These advantages are especially useful for gears of small module when the spaces between the tooth legs, as well as the legs, are formed radially from the gear. When the tooth legs and the spaces between the legs are formed inclined in a circumferential direction at a specified angle with respect to the radial direction of the gear, the gear has, in addition to the above advantages, another advantage in that although the gear is fully elastically deformable in a direction when meshing with another gear, a force acts in the opposite direction against the inertial rotation of the gear when the tooth concerned restores itself from elastic deformation, rapidly attenuating the resulting vibration and preventing variation of the pitch. This feature is very useful for timepiece gears which are intermittently driven repeatedly and serves to provide enhanced precision for the timepiece. When the spaces between the legs in each of the front and rear rows are made wider than the legs to circumferentially space a clearance between the leg of each front row tooth from the leg of the rear row tooth immediately adjacent thereto, the mold members for forming the front row teeth and the rear row teeth respectively can be properly fitted together with ease, so that the gear can be molded with ease. Further, if the front row teeth are axially spaced apart from the rear row teeth by a small distance, the front row tooth is more greatly elastically deformable without coming into contact with the rear row tooth. Thus the gear of this invention has various useful advantages.

What is claimed is:

1. A one-piece, integrally molded plastic gear for precision apparatus such as timepieces and acoustic devices and having elastically deformable teeth to provide cushioning properties to reduce noise and vibration during use, comprising a main body, two circumferential rows of teeth extending from said main body, said rows of teeth being axially offset with the teeth in one row being circumferentially offset relative to the teeth in the other row, each of said teeth having a terminating end portion and a longitudinally extending leg portion, each of said leg portions extending at an acute angle greater than zero degrees relative to a radial line of said gear, each of said terminating end portions defining a complete and integrally formed gear tooth, said leg portions of each of said teeth in each of said rows being circumferentially spaced from one another a distance which is greater than the circumferential width of each of said leg portions such that adjacent offset leg portions are circumferentially spaced from one another, whereby said teeth are elastically deformable in a circumferential direction to thereby reduce noise and vibration without inpairing the precision of the gear for use in precision apparatus.

2. A gear according to claim 1, wherein each of said leg portions have an axial thickness corresponding to one-half the thickness of said main body.

3. A gear according to claim 1, wherein each of said leg portions has a base integrally joined to said main body and an outer radial end section integrally jointed to said terminating end portion, each of said leg portions having a leading and a trailing edge extending between said base and said outer radial end section, each of said leg portions having a constant axial thickness between said base and said radial end section.

4. A gear according to claim 3, wherein the leading edge of one leg portion in one row is circumferentially spaced from the trailing edge of the immediately offset leg portion of the other row.

5. A gear according to claim 1, whereby said leg portions are constructed and arranged such that the disposition of said leg portions at said acute angle increases the elastic characteristics thereof.

6. A one-piece, integrally molded plastic gear for precision apparatus such as timepieces and acoustic devices and having elastically deformable teeth to provide cushioning properties to reduce noise and vibration during use, comprising a main body, two circumferential rows of teeth extending from said main body, said rows of teeth being axially offset with the teeth in one row being circumferentially offset relative to the teeth in the other row, each of said teeth having a terminating end portion and a longitudinally extending leg portion, each of said terminating end portions defining a complete and integrally formed gear tooth, said leg portions extending at an acute angle greater than zero degrees relative to a radial line of said gear, whereby said teeth are elastically deformable in a circumferential direction to thereby reduce noise and vibration without impairing the precision of the gear for use in precision apparatus.

7. A gear according to claim 6, wherein said acute angle is about 30 degrees.

8. A gear according to claim 6, whereby said leg portions are constructed and arranged such that the disposition of said leg portions at said acute angle increases the elastic characteristics thereof.

9. A gear according to claim 6, wherein each of said leg portions have a base integrally joined to said main body and an outer radial end section integrally joined to said terminating end portion, each of said leg portions having a leading and a trailing edge extending between said base and said outer radial end section, each of said leg portions having a constant axial thickness between said base and said radial end section.

10. A gear according to claim 9, wherein the leading edge of one leg portion in one row is circumferentially spaced from the trailing edge of the immediately offset leg portions of the other row.

11. A gear according to claim 6, wherein each of said leg portions has an axial thickness corresponding to one-half the thickness of said main body.

12. A gear according to claim 6, wherein each of said leg portions in each of said rows is spaced from one another a circumferential distance which is greater than the circumferential width of each of said leg portions.

* * * * *